US010592264B2

(12) United States Patent
Karyakin et al.

(10) Patent No.: US 10,592,264 B2
(45) Date of Patent: Mar. 17, 2020

(54) RUNTIME OPTIMIZATION OF ARITHMETIC EXPRESSIONS WITH DECIMAL NUMBERS

(71) Applicant: Oracle International Corporation, Redwood Shores, CA (US)

(72) Inventors: Alexey Karyakin, Waterloo (CA); Laurent Daynes, Saint-Ismier (FR)

(73) Assignee: Oracle International Corporation, Redwood Shores, CA (US)

( * ) Notice: Subject to any disclaimer, the term of this patent is extended or adjusted under 35 U.S.C. 154(b) by 58 days.

(21) Appl. No.: 15/981,011

(22) Filed: May 16, 2018

(65) Prior Publication Data

US 2019/0354391 A1 Nov. 21, 2019

(51) Int. Cl.
*G06F 9/455* (2018.01)
*G06F 7/491* (2006.01)

(52) U.S. Cl.
CPC .......... *G06F 9/45516* (2013.01); *G06F 7/491* (2013.01)

(58) Field of Classification Search
None
See application file for complete search history.

(56) References Cited

U.S. PATENT DOCUMENTS

| 4,493,027 A * | 1/1985 | Katz | G06F 9/4484 |
| | | | 712/228 |
| 5,652,862 A * | 7/1997 | Hanson | G06F 7/48 |
| | | | 708/204 |
| 7,149,765 B2 * | 12/2006 | Esbensen | G06F 17/2217 |
| | | | 708/490 |
| 9,858,054 B2 * | 1/2018 | Koju | G06F 8/4441 |
| 2006/0101425 A1 * | 5/2006 | Donovan | G06F 8/443 |
| | | | 717/136 |

OTHER PUBLICATIONS

IBM, IEEE Standard for Binary Floating-Point Arithmetic, 1985, The Institute of Electrical and Electronics Engineers, Inc (Year: 1985).*
Boldo, "Veried Compilation of Floating-Point Computations", 2015, Journal of Automated Reasoning (JAR) 54, 2 (2015), 135-163. DOI:https://doi.org/10.1007/s10817-014-9317-x (Year: 2015).*

* cited by examiner

*Primary Examiner* — Hossain M Morshed
(74) *Attorney, Agent, or Firm* — Ferguson Braswell Fraser Kubasta PC

(57) ABSTRACT

A method may include generating, from an expression, an expression tree including an arithmetic operation and conversion operations each converting an operand of the arithmetic operation from an initial decimal format to an optimized decimal format. The initial decimal format may include a shape. The method may further include at runtime, evaluating the arithmetic operation with initial operands represented in the initial decimal format, and specializing one of the conversion operations according to the shape of the corresponding initial operand.

20 Claims, 12 Drawing Sheets

| Initial Decimal Value 442 | | | Conversion State 444 | | | Optimized Decimal Value 446 | | Table of Conversion States 440 |
|---|---|---|---|---|---|---|---|---|
| Value | Min. scale | Max. scale | Min. scale | Max. scale | Current scale | Mantissa | Scale | |
| | | | -∞ | +∞ | N/A | | | Initial state of the conversion procedure |
| 5 | -8 | 0 | -8 | 0 | 0 | 5 | 0 | First compilation with scale = 0 |
| 123 | -7 | 0 | -7 | 0 | 0 | 123 | 0 | Adjustment of the lower bound, but no recompilation required because the upper bound determines the scale |
| 400 | -7 | 1 | -7 | 0 | 0 | 400 | 0 | No recompilation, bounds not changed |
| 15.67 | -8 | -1 | -7 | -1 | -1 | 1567 | -1 | Adjustment of the upper bound, recompilation with the scale value of -1 |
| 29174 | -6 | 0 | -6 | -1 | -1 | 2917400 | -1 | No recompilation occurs since the upper bound not changed. Multiplication by 100 performed due to the scale being not the maximum possible for this number. |
| 0 | -∞ | +∞ | -6 | -1 | -1 | 0 | -1 | Zero may be represented with any scale |
| In this state identified by the previous line, the conversion procedure can accept numbers with up to 2 fractional decimal digits, that have up to 8 total decimal digits, without recompilation. | | | | | | | | |
| 1e-14 | -15 | -7 | No valid values | | | 1 | -7 | Adjustment of the upper boundary (-7) would result in an empty valid range for scale. Therefore, the conversion enters the variable scale state |
| 123 | -7 | 0 | No valid values | | | 123 | 0 | Conversion procedure continues by assigning a scale value for each number without consulting the state variables |

FIG. 4E

RUNTIME OPTIMIZATION OF ARITHMETIC EXPRESSIONS WITH DECIMAL NUMBERS

BACKGROUND

Decimal encoding of numbers is used in a variety of systems and applications, such as databases, financial, and industrial computing. Database systems are no longer confined to simple querying and are increasingly requested to perform complex data analysis, involving complex numeric operations. Thus, there is an increasing need to support arithmetic operations with high-performance. Database systems have been extended with support for binary floating point primitive types allowing floating point operations (e.g., float and double, following the IEEE 754 standard), thereby avoiding costly conversion of decimal representations into binary representations when applications know in advance that floating operations are sufficient. However, it may still be necessary to support fast arithmetic operations when the loss of precision or the lack of reproducible results from using floating point operations are unacceptable. Arithmetic operations on decimal encoded numbers are often complex and usually unsupported by hardware, and are therefore often implemented in a software library, which is typically slower than using native hardware instructions. For example, Decimal Floating Point arithmetic (DFP) for 32-, 64-, and 128-bit representations has been standardized in IEEE 754-2008, but is rarely supported (and Decimal Fixed Point arithmetic is not supported at all). Some database systems allow re-encoding ahead of time of variable-length decimal representations into binary representations. However, just-in-time conversion to an optimized decimal format best suited for a particular arithmetic expression (e.g., used in a query) remains an unsolved problem.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including generating, from an expression, an expression tree including an arithmetic operation and conversion operations each converting an operand of the arithmetic operation from an initial decimal format to an optimized decimal format. The initial decimal format includes a shape. The method further includes at runtime, evaluating the arithmetic operation with initial operands represented in the initial decimal format, and specializing one of the conversion operations according to the shape of the corresponding initial operand.

In general, in one aspect, one or more embodiments relate to a system including a repository configured to store an expression and an expression tree, a memory coupled to a processor, an ahead-of-time compiler, executing on the processor and using the memory, configured to generate, from the expression, the expression tree including an arithmetic operation and conversion operations each converting an operand of the arithmetic operation from an initial decimal format to an optimized decimal format. The initial decimal format includes a shape. The system further includes a just-in-time (JIT) compiler, executing on the processor and using the memory, configured to at runtime, evaluate the arithmetic operation with initial operands represented in the initial decimal format, and specialize one of the conversion operations according to the shape of the corresponding initial operand.

In general, in one aspect, one or more embodiments relate to a non-transitory computer readable medium including instructions that, when executed by a processor, perform: generating, from an expression, an expression tree including an arithmetic operation and conversion operations each converting an operand of the arithmetic operation from an initial decimal format to an optimized decimal format. The initial decimal format includes a shape. The instructions further perform: at runtime, evaluating the arithmetic operation with initial operands represented in the initial decimal format, and specializing one of the conversion operations according to the shape of the corresponding initial operand.

Other aspects of the invention will be apparent from the following description and the appended claims.

BRIEF DESCRIPTION OF DRAWINGS

FIG. 4A, FIG. 4B, FIG. 4C, FIG. 4D, and FIG. 4E show examples in accordance with one or more embodiments of the invention.

DETAILED DESCRIPTION

Figure 1A:
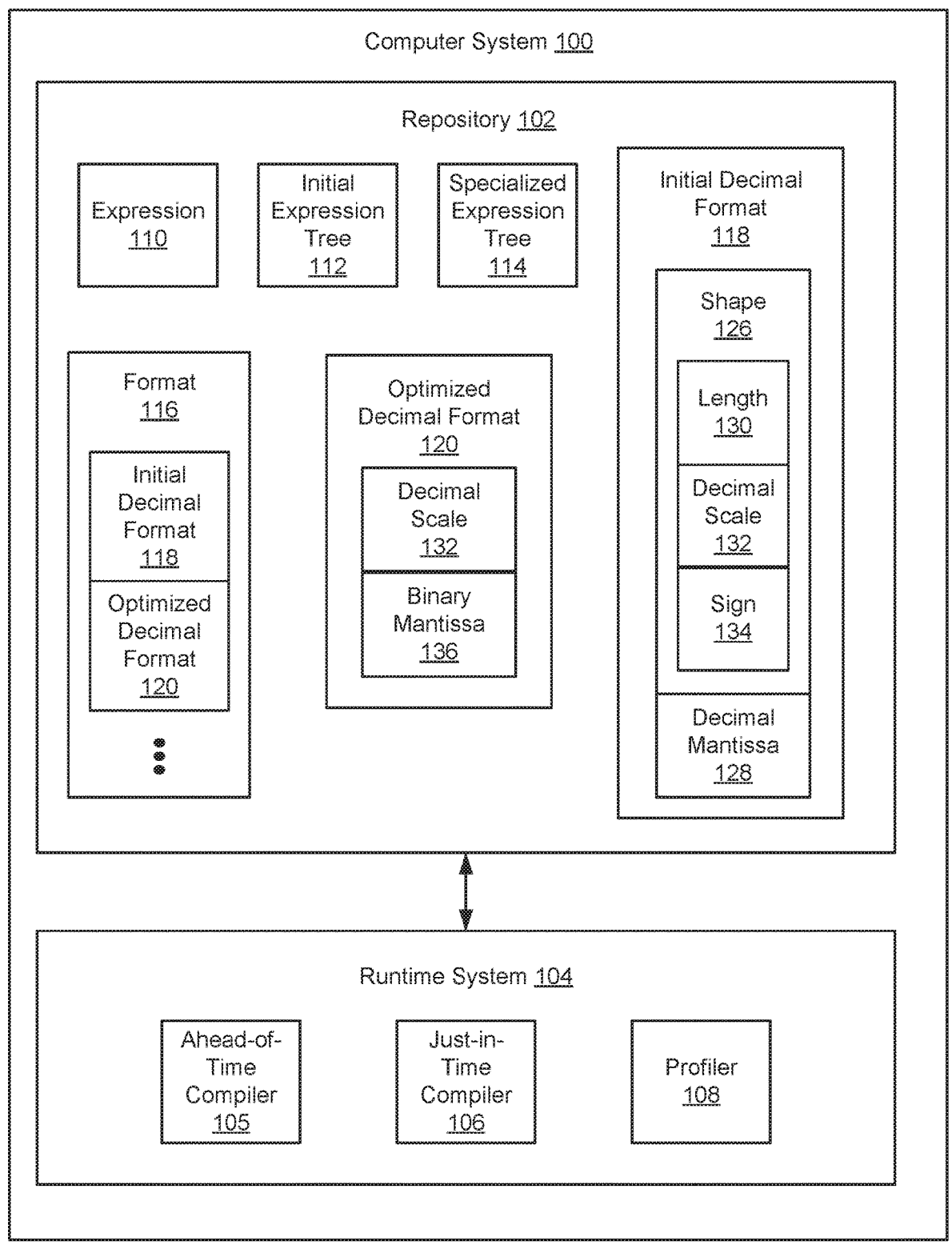
FIG. 1A, FIG. 1B, and FIG. 1C show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to efficiently evaluating arithmetic expressions with decimal numbers. In one or more embodiments, an expression tree that includes conversion operations and arithmetic operations is generated from an expression. Operand values may be converted, at runtime, from an initial decimal format into an optimized decimal format based on a history of how previous operand values were converted. The optimized decimal format may be assigned based on a speculation (e.g., by a just-in-time (JIT) compiler) that the optimized decimal format will be sufficient to represent a succession of values of the operand (e.g., as rows or columns of a table are processed by a query). The optimized decimal format may be based on a shape of the initial decimal format that includes a scale (i.e., exponent) and a length based on the number of significant digits in the decimal value. Each conversion operation and each arithmetic operation may be specialized to represent inputs and outputs in specific optimized formats.

FIG. 1A shows a computer system (100) in accordance with one or more embodiments of the invention. As shown in FIG. 1A, the computer system (100) includes a repository (102), and a runtime system (104). In one or more embodiments, the computer system (100) takes the form of the computing system (500) described with respect to FIG. 5A and the accompanying description below, or takes the form of the client device (526) described with respect to FIG. 5B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes an expression (110), an initial expression tree (112), a specialized expression tree (114), and a format (116). The expression (110) may be any arithmetic expression. The expression (110) may include operations (e.g., +, −, *, /, etc.) that are applied to one or more operands (e.g., numerical values) to yield a result. Simple examples of expressions (110) include: x=a+b and y=a*c+x. The expression (110) may be a recursive structure such that an operand may in turn be an expression (110) (i.e., a sub-expression). For example, x=(a*(b*(c+d)−(e/f))) is an expression (110) that includes sub-expressions. The expression (110) may be part of a statement in a programming language.

Figure 1B:
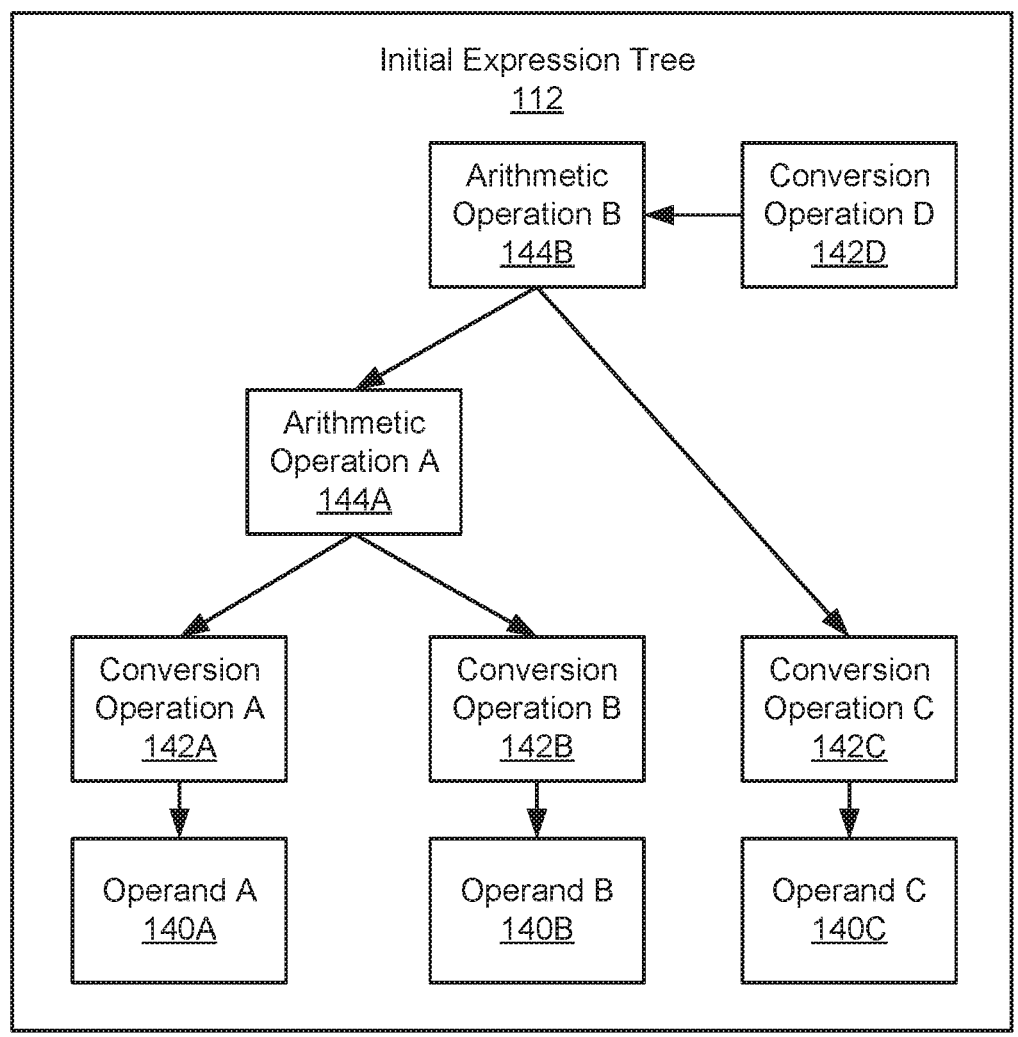
Figure 1B:
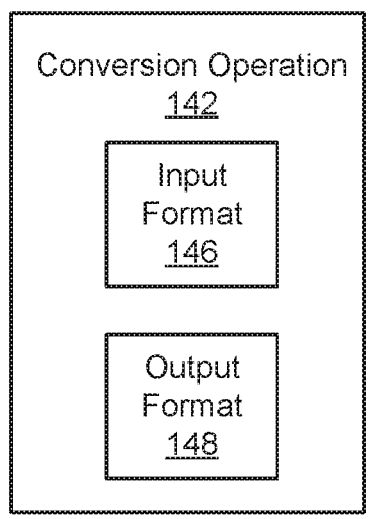

In one or more embodiments, the expression (110) may be transformed (e.g., compiled) into an initial expression tree (112). The initial expression tree (112) may be an abstract syntax tree (AST). In one or more embodiments, the initial expression tree (112) includes operands (e.g., operand A (140A), operand B (140B), operand C (140C)), conversion operations (e.g., conversion operation A (142A), conversion operation B (142B), conversion operation C (142C), conversion operation D (142D)), and arithmetic operations (e.g., arithmetic operation A (144A), arithmetic operation B (144B)), as shown in FIG. 1B. FIG. 1B illustrates an expression where the result of applying arithmetic operation A (144A) on operand A (140A) and operand B (140B) is an input (e.g., an operand) to arithmetic operation B (144B).

Returning to FIG. 1A, in one or more embodiments, the format (116) may be any representation that includes one or more elements. In one or more embodiments, the format (116) is an initial decimal format (118), an optimized decimal format (120), or any other format. In one or more embodiments, the initial decimal format (118) includes a shape (126) and a decimal mantissa (128). In one or more embodiments, the shape (126) includes a length (130), a decimal scale (132), and a sign (134).

In one or more embodiments, the decimal scale (132) is an exponent that represents a power of a decimal base, where the decimal base may be a power of 10. For example, the decimal scale (132) may be an exponent that represents a power of 10, a power of 100, a power of 1000, etc. The decimal mantissa (128) may be a string of digits in a decimal base, where the decimal base may be any power of 10. For example, the decimal base may be 100, in which case the value of each digit may range from 0 to 99, and each digit can be stored in a single byte. The length (130) may be a measure of the size of the decimal mantissa (128). For example, the length (130) may be the number of significant digits of the decimal mantissa (128). The length (130) may be arbitrarily large (e.g., within the space constraints imposed by the computer system (100)). In one or more embodiments, the initial decimal format (118) includes a sign (134) that indicates whether the value corresponding to the decimal mantissa (128) and the decimal scale (132) represents a positive or negative number.

In one or more embodiments, a value represented in the initial decimal format (118) is a polynomial in a power of 10 base (e.g., base 100), where each digit in the decimal mantissa (128) is multiplied by the power of 10 base corresponding to the position of the digit within the decimal mantissa (128). For example, the number 12345.67 may be represented with a decimal scale (132) of 2 and a decimal mantissa (128) consisting of a string of four base 100 digits: <1, 23, 45, 67>. A decimal scale (132) of zero may correspond to the number 1.234567, where the decimal point in the decimal mantissa (128) is placed after the first significant digit. Similarly, a decimal scale (132) of 2 may correspond to moving the decimal point in the decimal mantissa (128) to the right (i.e., relative to a decimal scale (132) of zero) by two base 100 digits, resulting in the number 12345.67. Alternatively, a decimal scale (132) of −2 means that the decimal point in the decimal mantissa (128) is moved to the left by two base 100 digits, resulting in the number 0.0001234567.

In one or more embodiments, the optimized decimal format (120) includes a decimal scale (132) and a binary mantissa (136). In one or more embodiments, the binary mantissa (136) is represented as an integer data type, such as 32- or 64-bit integers, that is natively supported (e.g., as a representation used in machine registers and/or stack frames) by the computer system (100). In one or more embodiments, the number of digits that the binary mantissa (136) may store depends on the data type used to store the binary mantissa (136). For example, a 32-bit integer may be sufficient to store 9 decimal digits. As another example, a 64-bit integer may be sufficient to store 18 decimal digits. In one or more embodiments, the binary mantissa (136) includes a sign bit. In one or more embodiments, different-sized integer representations may be used to implement binary mantissas (136) of different lengths (e.g., with different numbers of significant digits).

In one or more embodiments, a value represented in the optimized decimal format (120) is a power of 10 scaled value of the binary mantissa (136), where the binary mantissa (136) is multiplied by the power of 10 base (e.g., base 100) raised to the value of the decimal scale (132).

In one or more embodiments, there are multiple ways to represent a number value with a decimal scale (132) and a binary mantissa (136). For example, the number 12345.67 may be represented with a decimal scale (132) of −1 and a binary mantissa (136) of 1234567, relative to base 100 (i.e., 1234567 is multiplied by $100^{-1}$). Alternatively, the number 12345.67 may be represented with a decimal scale (132) of −3 and a binary mantissa (136) of 12345670000, relative to base 100 (i.e., 12345670000 is multiplied by $100^{-3}$). However, there may be decimal numbers that cannot be represented in the optimized decimal format (120) for a specific scale value. For example, with a scale of 2, it is impossible to represent the number 0.1 (i.e., one tenth) in the optimized decimal format (120) since the binary mantissa (136) must be an integer.

Returning to FIG. 1B, in one or more embodiments, a conversion operation (142) includes an input format (146) and an output format (148). The input format (146) may be any format (116) (e.g., a specific initial decimal format (118), a specific optimized decimal format (120), etc.). Similarly, the output format (148) may be any format (116). The conversion operation (142) may convert its input (e.g., operand (140A, 140B, 140C)) from the input format (146) to the output format (148). A conversion operation (e.g., conversion operation D (142D)) may convert the result of an arithmetic operation (e.g., arithmetic operation B (144B)) from the optimized decimal format (120) to the initial decimal format (118) (e.g., to convert a final result to an initial decimal format (118) used in some other operation of the computer system (100)).

Returning to FIG. 1A, in one or more embodiments, the initial expression tree (112) may be transformed (e.g., compiled) into a specialized expression tree (114) that is specialized for values represented in specific formats (116) (e.g., a specific initial decimal format (118), a specific optimized decimal format (120), etc.). In one or more embodiments, a specialized expression tree (114) may include values represented in different optimized decimal formats (120), each corresponding to a specific decimal scale (132). In one or more embodiments, multiple specialized expression trees (114) may be generated from a single initial expression tree (112). For example, a new specialized expression tree (114) may be generated based on the formats (116) of operands received at runtime.

Figure 1C:
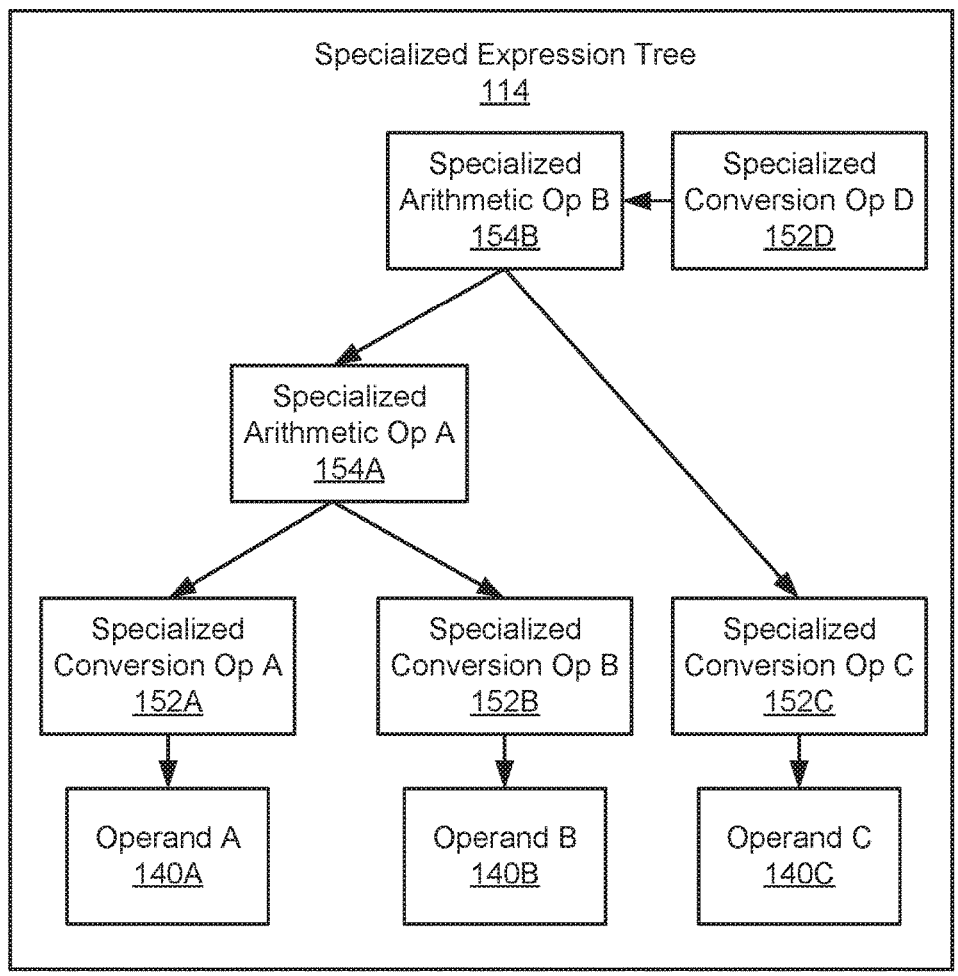
Figure 1C:
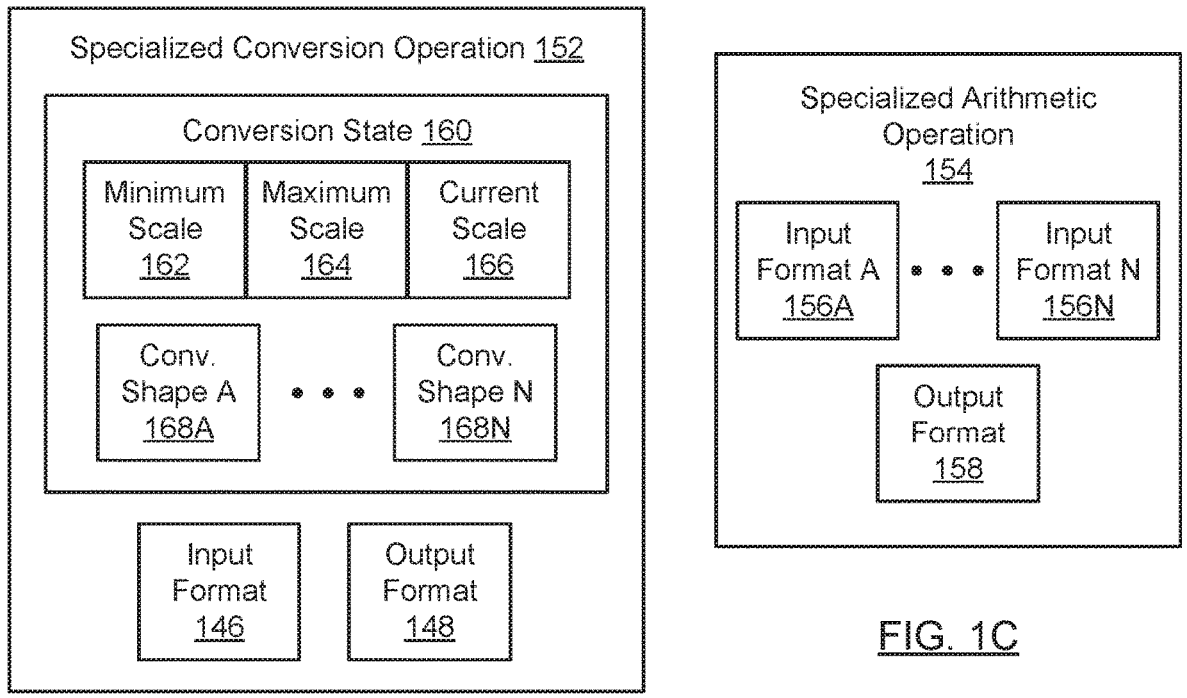

In one or more embodiments, as shown in FIG. 1C, the specialized expression tree (114) includes operands (e.g., operand A (140A), operand B (140B), operand C (140C)), specialized conversion operations (e.g., specialized conversion operation A (152A), specialized conversion operation B (152B), specialized conversion operation C (152C), specialized conversion operation D (152D)), and specialized arithmetic operations (e.g., specialized arithmetic operation A (154A), specialized arithmetic operation B (154B)).

In one or more embodiments, a specialized conversion operation (152) includes an input format (146), an output format (148), and conversion state (160). A specialized conversion operation (152) may include specific constants to improve runtime performance. For example, the output format (148) may be optimized (e.g., at runtime) relative to a specific shape (126) of the initial decimal format (118) of the input format (146) (e.g., where the output format (148) is optimized based on specific constants for the length (130), decimal scale (132) and/or sign (134) of the initial decimal format (118) of the input format (146)).

The conversion state (160) may result from a history of previous executions of the conversion operation, which may be executed multiple times on different values, each time potentially changing the conversion state (160). For example, the initial expression tree (112) may correspond to a predicate filter of an SQL query that is evaluated multiple times as a dataset is processed, where a conversion operation may be applied to multiple values of an operand. In one or more embodiments, the conversion state (160) includes a minimum scale (162), a maximum scale (164), and a current scale (166). The minimum scale (162) may represent the minimum value of the decimal scale (132) used in previous executions of the conversion operation. Similarly, the maximum scale (164) may represent the maximum value of the decimal scale (132) used in previous executions of the conversion operation. The current scale (166) may represent the most recent value of the decimal scale (132).

In one or more embodiments, the conversion state (160) includes conversion shapes (168A, 168N) for which the specialized conversion operation (152) includes specialized code. Each conversion shape (168N) may correspond to a shape (126) of the initial decimal format (118). For example, the specialized conversion operation (152) may include code that is optimized for a specific length (130), decimal scale (132) and/or sign (134) of a shape (126) of the initial decimal format (118).

Continuing with FIG. 1C, in one or more embodiments, a specialized arithmetic operation (154) is an operation that is specialized to process inputs represented in specific input formats (156A, 156N), yielding an output represented in a specific output format (158). Each input format (156A, 156N) may be any format (116). Similarly, the output format (158) may be any format (116). For example, arithmetic operation A (144A) from the initial expression tree (112) of FIG. 1B may be specialized into specialized arithmetic operation A (154A) of FIG. 1C, such that specialized arithmetic operation A (154A) requires its input values to be in a specific optimized decimal format (120). As another example, a specialized arithmetic operation (154) may require each of its inputs to be in the initial decimal format (118), and yield an output represented in a specific shape (126) of the initial decimal format (118). In one or more embodiments, a specialized arithmetic operation (154) may be performed on input values in the optimized decimal format (120) when a common scale for the input values is found that enables the specialized arithmetic operation (154) to be performed using a binary mantissa (136). In one or more embodiments, a specialized arithmetic operation (154) that requires its input values and output value to be in the optimized decimal format (120) may be implemented using central processing unit (CPU) instructions that are native to the computer system (100).

Returning to FIG. 1A, in one or more embodiments, the runtime system (104) includes an ahead-of-time (AOT) compiler (105), a just-in-time (JIT) compiler (106), and a profiler (108). In one or more embodiments, the JIT compiler (106) may be implemented in hardware (e.g., circuitry), software, firmware, and/or any combination thereof. The JIT compiler (106) may be a computer program designed to transform source code written in a programming language, or intermediate representation of a program into native instructions of the computer system (100) (e.g., machine code). For example, the intermediate representation of a program may include an initial expression tree (112) or specialized expression tree (114). In one or more embodiments of the invention, the JIT compiler (106) includes functionality to translate an intermediate representation of a program (e.g., into virtual machine code that a virtual machine is configured to execute). For example, the JIT compiler (106) may include functionality to create code that, when executed in lieu of direct execution of an intermediate representation of the program, improves the execution speed of the program. In one or more embodiments of the invention, the JIT compiler (106) includes functionality to perform compilation of operations or functions as the program is executing.

In one or more embodiments, the JIT compiler (106) may include functionality that enables speculative optimization. Speculation is a technique in which the JIT compiler (106) is told to make assumptions (i.e., to speculate) about some aspect of program execution (e.g., a branch of conditional execution never taken, or a variable being a constant) in order to produce a more efficient executable form of the program. In the event that a speculation fails, the runtime of the JIT compiler (106) may deoptimize the executable code (i.e., revert the executable code from native instructions to an intermediate representation), which may then be modified to satisfy the failed assumptions before resuming execution. In one or more embodiments, speculative optimization capabilities of the JIT compiler (106) are used to speculate on the decimal scale (132) and length (130) of the initial decimal format (118) of the operand of a conversion operation. In one or more embodiments, speculative optimization capabilities of the JIT compiler (106) are used to speculate on the format of the operands of binary arithmetic operations. In one or more embodiments, speculative optimization capabilities of the JIT compiler (106) are used to speculate on the scale of each the operands of binary arithmetic operations, where the operands are in optimized decimal format (120).

In one or more embodiments, the AOT compiler (105) may be implemented in hardware (e.g., circuitry), software, firmware, and/or any combination thereof. The AOT compiler (105) may be a computer program designed to transform source code (e.g., source code that includes an expression (110)) written in a programming language, or intermediate representation of a program into machine code or another intermediate representation of the program. For example, the intermediate representation of a program may include an initial expression tree (112). For example, the initial expression tree (112) may be interpreted by a virtual machine and then specialized into a specialized expression tree (114) that is also interpreted by the virtual machine. In one or more embodiments of the invention, the AOT compiler (105) includes functionality to translate an intermediate representation of a program (e.g., into virtual machine code that a virtual machine is configured to execute).

In one or more embodiments, speculative optimization is supported by profilers. The profiler (108) may be implemented in hardware (e.g., circuitry), software, firmware, and/or any combination thereof. In one or more embodiments, the profiler (108) includes functionality to track information about aspects of the execution of specialized expression trees (114), such as formats (116) (e.g., shapes (126)) used to represent operands, branches taken, etc. For example, the profiler (108) may include functionality to track information about the prior evaluation of specialized conversion operations (152) (e.g., conversion states (160)) in a specialized expression tree (114).

While FIG. 1A, FIG. 1B, and FIG. 1C show configurations of components, other configurations may be used without departing from the scope of the invention. For example, various components may be combined to create a single component. As another example, the functionality performed by a single component may be performed by two or more components.

Figure 2:
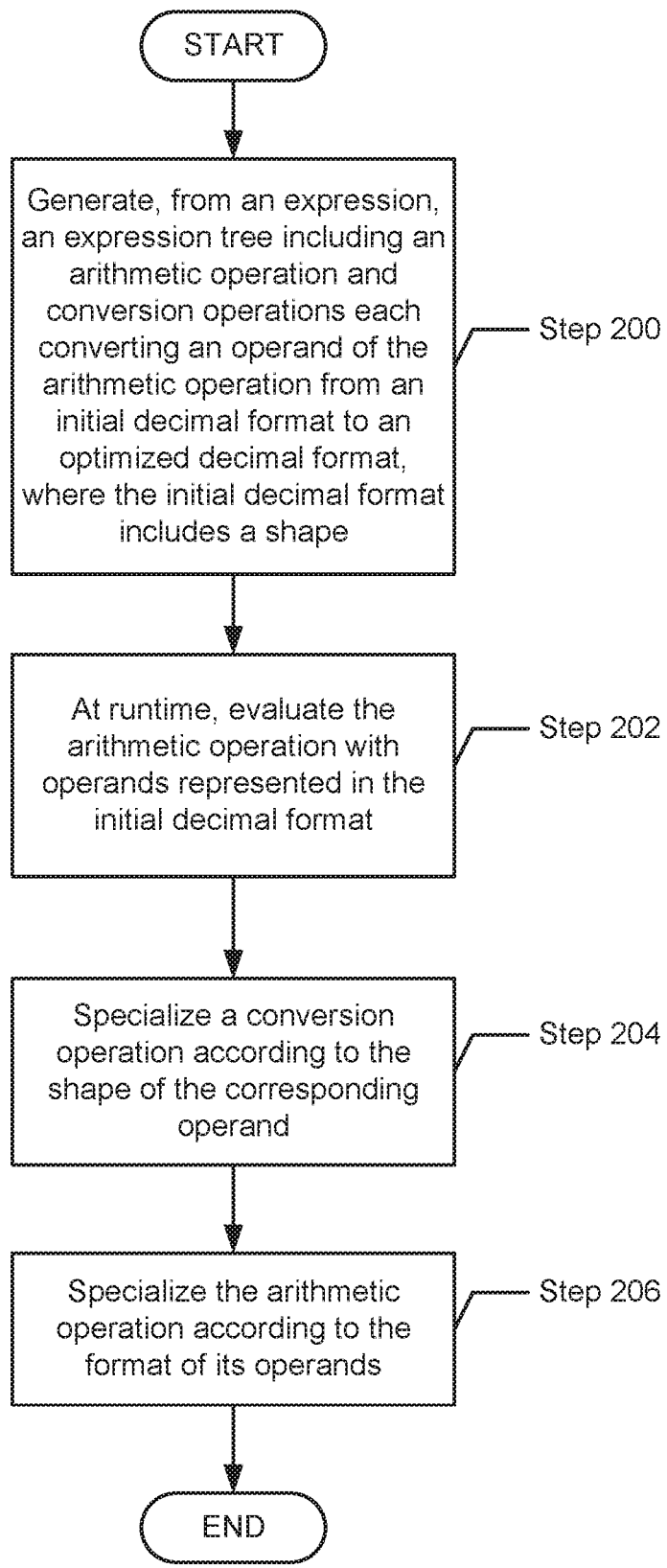
FIG. 2, FIG. 3A and FIG. 3B show flowcharts in accordance with one or more embodiments of the invention.

FIG. 2 shows a flowchart in accordance with one or more embodiments of the invention. The flowchart depicts a process for optimizing an expression tree. One or more of the steps in FIG. 2 may be performed by the components (e.g., the ahead-of-time (AOT) compiler (105), just-in-time compiler (106), or the profiler (108) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, an expression tree is generated from an expression. The expression tree includes an arithmetic operation and conversion operations each converting operands of the arithmetic operation from an initial decimal format to an optimized decimal format. In one or more embodiments, the expression is any arithmetic expression. The expression may include an operation (e.g., +, −, *, /, etc.) that is applied to one or more operands (e.g., numerical values) to yield a result. The expression may be a recursive structure such that an operand may in turn be a sub-expression. In one or more embodiments, the expression may be converted into an expression tree (e.g., an abstract syntax tree (AST)) that includes the arithmetic operation, operands, and conversion operations.

In one or more embodiments, the initial decimal format includes a shape and a decimal mantissa. The shape may include a length, a decimal scale, and a sign. The length may be a measure of the size of the decimal mantissa. For example, the length may be the number of significant digits of the decimal mantissa. The decimal scale may be an exponent that represents a power of 10. The decimal mantissa may be a string of digits in any decimal base that is a power of 10. For example, the decimal base may be 100, in which case the value of each digit may range from 0 to 99. The sign may indicate whether the value corresponding to the decimal mantissa and the decimal scale represents a positive or negative number.

In one or more embodiments, a value represented in the initial decimal format is a polynomial in a power of 10 base (e.g., base 100), where each digit in the decimal mantissa is multiplied by the power of 10 base corresponding to the position of the digit within the decimal mantissa. For example, the number 12345.67 may be represented with a decimal scale of 2 and a decimal mantissa consisting of a string of four base 100 digits: <1, 23, 45, 67>.

In one or more embodiments, the optimized decimal format includes the decimal scale and a binary mantissa. The binary mantissa may be represented as an integer data type, such as 32- or 64-bit integers, that is natively supported by the computer system. In one or more embodiments, a value represented in the optimized decimal format is a power of 10 scaled value of the binary mantissa, where the binary mantissa is multiplied by the power of 10 base (e.g., base 100) raised to the value of the decimal scale. For example, the number 12345.67 may be represented with a decimal scale of −1 and a binary mantissa of 1234567, relative to base 100 (i.e., 1234567 is multiplied by $100^{-1}$).

In Step 202, at runtime, the arithmetic operation is evaluated with operands represented in the initial decimal format. In one or more embodiments, before evaluating the arithmetic operation, each operand is converted (e.g., by a conversion operation corresponding to the operand) from the initial decimal format to the optimized decimal value.

In one or more embodiments, the decimal mantissa string of the operand is converted to a binary mantissa by:

1) looping through the string of digits in the decimal mantissa, decoding each digit based on the sign of the shape of the initial decimal format of the operand.

2) multiplying each decoded digit by a power of 10 (e.g., 100) corresponding to the position of the digit within the string, and 3) adding the results of 2) above to form the binary mantissa.

For example, if the length of the decimal mantissa string is 2, then the binary mantissa would be equal to the decoded value of the first digit multiplied by a power of 10 (e.g., 100) plus the decoded value of the second digit.

In Step 204, one of the conversion operations is specialized according to the shape of its corresponding operand. Each conversion operation may be originally created in an unspecialized state (e.g., when initially generating the expression tree, as in Step 200 above). In one or more embodiments, specializing the conversion operation is a speculative optimization based on the shape of the corresponding operand. For example, the speculative optimization may assume specific constants for the length, scale and/or sign of the operand. The speculative optimization may or may not be applicable to future operands (e.g., see description of FIG. 3A below). As an example, based on the shape of its corresponding operand, the specialized conversion operation may assume a length of 2, a decimal scale of 2, and a sign of 1.

In one or more embodiments, the specialized conversion operation is added to a new specialized expression tree generated from the initial expression tree. Alternatively, the specialized conversion operation may replace an existing conversion operation in the initial expression tree.

In Step 206, the arithmetic operation is specialized according to the format of its operands (see description of FIG. 3B below).

Figure 3A:
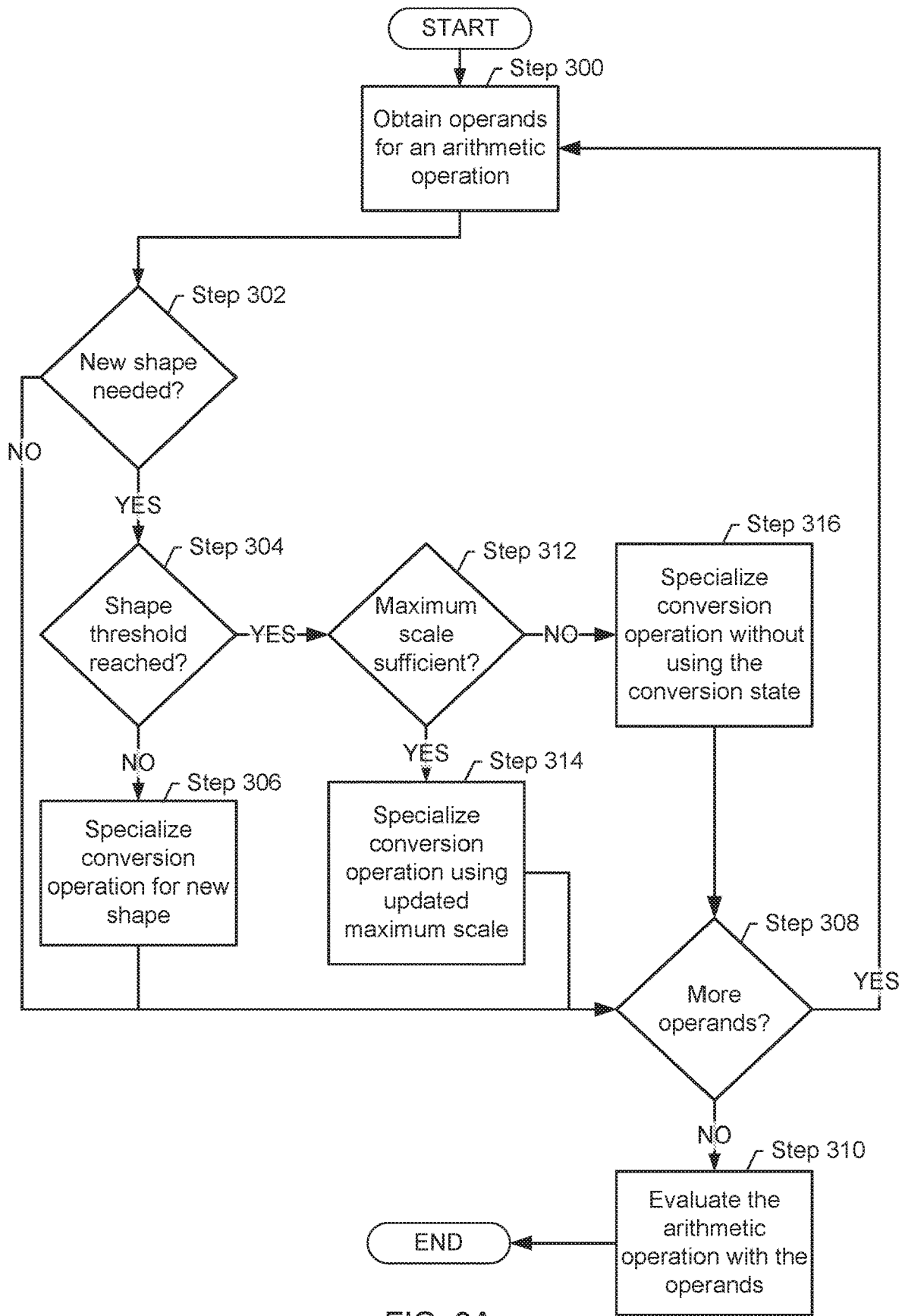

FIG. 3A shows a flowchart in accordance with one or more embodiments of the invention. The flowchart depicts a process for specializing a conversion operation. Moreover, the flowchart in FIG. 3A may correspond to Step 204 in FIG. 2. One or more of the steps in FIG. 3A may be performed by the components (e.g., the ahead-of-time (AOT) compiler (105), just-in-time compiler (106), or the profiler (108) of the computer system (100)), discussed above in reference to FIG. 1A. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 300, operands are obtained for an arithmetic operation (see description of Step 202 above). For example, operands may be obtained at runtime when an expression that includes the arithmetic operation (e.g., corresponding to an SQL query) is evaluated.

In Step 302, it is determined whether the conversion operation corresponding to each operand is already specialized for the shape of the operand. In one or more embodiments, the conversion operation includes a conversion state that includes shapes of the initial decimal format for which the specialized conversion operation already includes specialized code. For example, the specialized conversion operation may include code that is optimized for inputs with a specific length, decimal scale and/or sign of a shape of the initial decimal format corresponding. If the conversion operation is already specialized for the shape of the operand, then execution continues with Step 308 below. Otherwise, if the conversion operation is not already specialized for the shape of the operand, then execution continues with Step 304 below.

In Step 304, it is determined whether a shape threshold has been reached. In one or more embodiments, the shape threshold indicates the maximum number of shapes for which a conversion operation may be specialized. If the shape threshold has not been reached, then in Step 306, the conversion operation is specialized according to the new shape (see description of Step 204 above). The new shape may then be added to the conversion shapes included in the conversion state of the conversion operation. Execution then continues with Step 308 below. Otherwise, if the shape threshold has been reached, then execution continues with Step 312 below, to specialize the conversion operation in a generic (e.g., shape independent) manner.

In Step 308, if there are additional operands to be processed, then execution continues with Step 300 above, to obtain the next operands for the arithmetic operation. Otherwise, if all operands of the arithmetic operation have been processed (e.g., converted), then in Step 310, the arithmetic operation is evaluated with the operands (see description of Step 202 above).

If, in Step 312, it is determined that the maximum scale of the conversion state of the conversion operation is sufficient to represent the operand, then execution continues with Step 314 below. In one or more embodiments, the maximum scale of the conversion state is sufficient to represent the operand when the maximum scale is not less than the minimum scale of the conversion state. Otherwise, if it is determined that the maximum scale of the conversion state of the conversion operation is insufficient to represent the operand, then execution continues with Step 316 below.

In one or more embodiments, the conversion state is based on a history of converting previous values of the operand to the optimized decimal format. That is, the conversion may be executed on a succession of different operand values, each time potentially changing the conversion state. For example, the operand may have been converted multiple times when evaluating the arithmetic operation on a succession of operand values (e.g., where each successive operand value is a cell in a row or column of a table), where each time the conversion used a scale based on the operand value.

In one or more embodiments, the maximum scale of the conversion state is the largest decimal scale used by the conversion operation based on the history of converting previous values of the operand. Similarly, the minimum scale of the conversion state is the smallest decimal scale used by the conversion operation based on the history of converting previous values of the operand.

If the maximum scale of the conversion state cannot be used to represent the current value of the operand (e.g., if using the maximum scale would result in a loss of precision when representing the current value of the operand), then the maximum scale of the conversion state may be set to the maximum scale that can be used to represent the current value of the operand in the optimized decimal format. For example, the maximum scale (e.g., relative to the size of an integer in the optimized decimal format for the computer system in which the specialized operation is being evaluated) may be the maximum number of digits that the decimal (e.g., radix) point within the mantissa may be moved to the right to represent the value of the operand.

Similarly, in one or more embodiments, it is determined whether the minimum scale of the conversion state may be used to represent the current value of the operand. If the minimum scale of the conversion state cannot be used to represent the current value of the operand, then the minimum scale of the conversion state may be set to the minimum scale that can be used to represent the current value of the operand. For example, the minimum scale may be the maximum number of digits that the decimal point within the mantissa may be moved to the left to represent the value of the operand.

Table 1 below shows examples of the minimum scale and maximum scale for values represented as base 100 digits and a 64-bit mantissa, where the 64-bit mantissa may accommodate 9 such base 100 digits. In one or more embodiments, the maximum scale and the minimum scale that can be used to represent a decimal value may be determined by functions whose input includes the number of significant digits in the decimal value and the corresponding scale (e.g., exponent).

TABLE 1

Examples of minimum and maximum scales

| Value | Minimum Scale | Mantissa with Min Scale | Maximum Scale | Mantissa with Max Scale |
|---|---|---|---|---|
| 1 | −8 | 1 * 100^8 | 0 | 1 |
| 100 | −7 | 1 * 100^8 | 1 | 1 |
| 123 | −7 | 123 * 100^7 | 0 | 123 |
| 1.23 | −8 | 123 * 100^7 | −1 | 123 |

In Step 314, the conversion operation is specialized to convert its operand using a current scale and the conversion state. The conversion operation may be specialized to set the current scale to the maximum scale of the conversion state. In one or more embodiments, the current scale may be set to any value between the maximum scale of the conversion state and the minimum scale of the conversion state. In one or more embodiments, the current scale is set as a compile-time constant in the compiled code that implements the conversion operation. In one or more embodiments, the code that implements the conversion operation is recompiled when the corresponding conversion state (e.g., the current scale) is modified. In one or more embodiments, the code that implements the conversion operation rewrites itself based on the modified conversion state. For example, the conversion operation may be recompiled when the current iteration of Step 314 sets the current scale to a value that differs from the value of the current scale set in a previous iteration of Step 314.

In one or more embodiments, the maximum scale of the conversion state is used because using a decimal scale that is as large as possible may make it possible to keep the mantissa as small as possible, potentially resulting in simpler, more efficient arithmetic operations. For example, using a larger scale may avoid the need to increase the size of the mantissa due to multiplying the mantissa by a power of 10. Similarly, a smallest possible length may be used to represent the current operand value in the optimized decimal format, in order to reduce the amount of space required to represent the binary mantissa.

After executing Step 314, execution then continues with Step 308 above.

In Step 316, the scale of the optimized decimal format is set without using the conversion state (e.g., since there are no possible values between the minimum scale of the conversion state and the maximum scale of the conversion state). In one or more embodiments, the scale of the optimized decimal format may be set based on the current value of the operand. That is, in this scenario, the scale of the optimized decimal format is a variable (e.g., a variable whose value is based on the current value of the operand) rather than a compile-time constant. For example, the scale of the optimized decimal format may be set to the maximum scale that can be used to represent the current value of the operand (e.g., within the space constraints on the optimized decimal format imposed by the computer system). Execution then proceeds with Step 308 above.

Figure 3B:
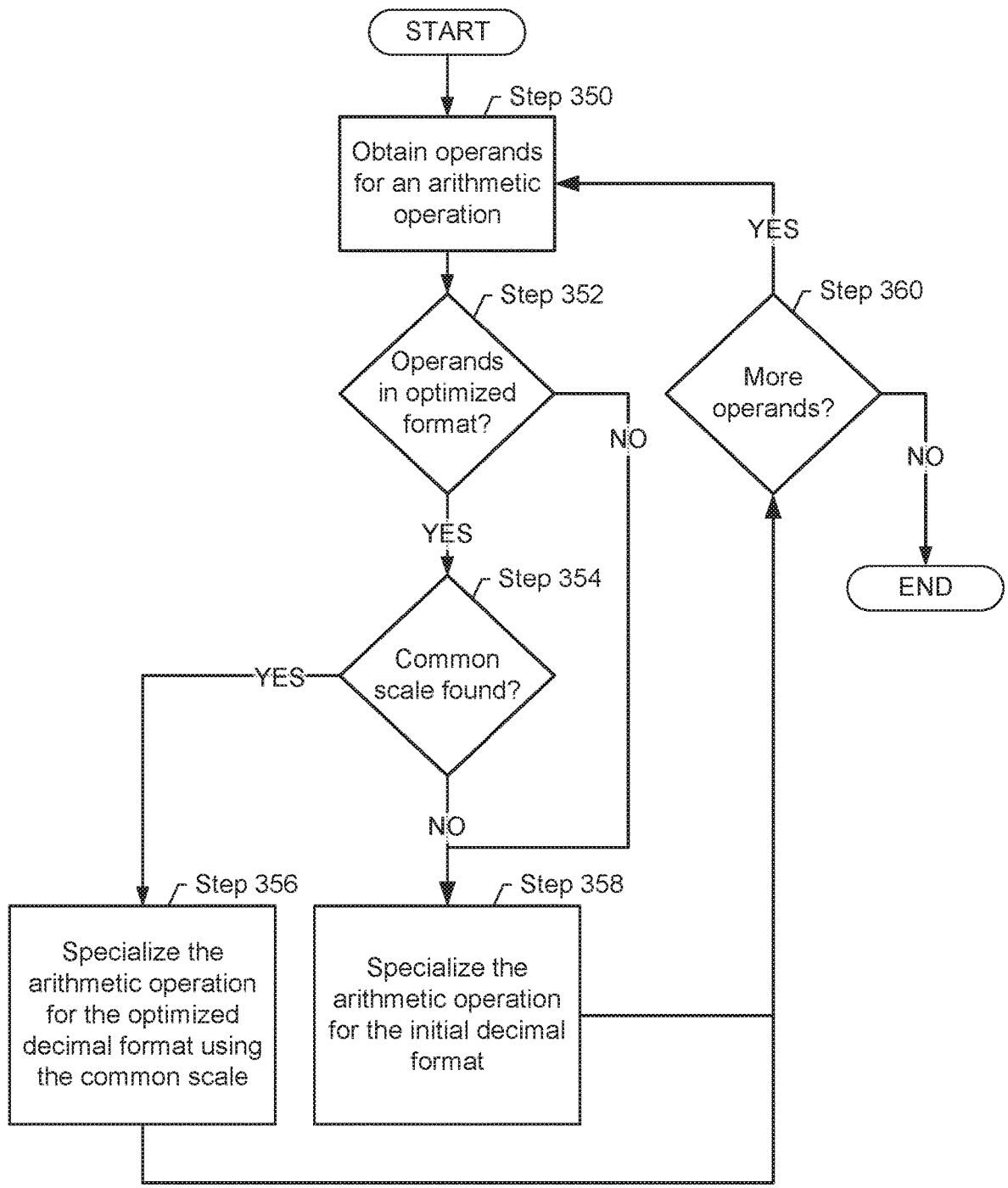

FIG. 3B shows a flowchart in accordance with one or more embodiments of the invention. The flowchart depicts a process for specializing an arithmetic operation. Moreover, the flowchart in FIG. 3B may correspond to Step 206 in FIG. 2. One or more of the steps in FIG. 3B may be performed by the components (e.g., the ahead-of-time (AOT) compiler (105), just-in-time compiler (106), or the profiler (108) of the computer system (100)), discussed above in reference to FIG. 1A. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 350, operands are obtained for an arithmetic operation (see description of Step 300 above).

If, in Step 352, it is determined that all of the operands are represented in the optimized decimal format, then Step 354 below is executed. For example, an operand may be represented in the optimized decimal format due to conversion to the optimized decimal format by a conversion operation corresponding to the operand. Otherwise, if it is determined that not all of the operands are represented in the optimized decimal format (e.g., one or more of the operands are represented in the initial decimal format), then Step 358 below is executed.

If, in Step 354, a common scale for the optimized decimal format is found for the operands, then Step 356 below, corresponding to a "fast path" for evaluating the arithmetic operation, is executed. If the operands are represented in the optimized decimal format using different scales, then an attempt may be made to identify a common scale for the optimized decimal format into which all of the operands may be converted. For example, small and efficient compiled code may be generated when the same scale is used to represent each operand of the arithmetic operation. Otherwise, if a common scale is not found for the operands, then Step 358 below is executed.

An operand may be converted from one scale to another scale by adjusting the mantissa as necessary. For example, the number 12345.67 may be represented with a scale of −1 and a mantissa of 1234567, relative to base 100 (i.e., 1234567 is multiplied by $100^{-1}$). If the common scale is −3, then the number 12345.67 may be converted to use the common scale of −3 with a mantissa of 12345670000, relative to base 100 (i.e., 12345670000 is multiplied by $100^{-3}$).

However, the difference between the scales of the operands represented in the optimized decimal format may be so large that it is not possible to perform the arithmetic operation using the optimized decimal format. That is, it may be impossible to find a common scale for the operands using the optimized decimal format in which the arithmetic operation may be performed. In other words, the optimized decimal format might not support the range of scales required to represent the mantissa of each operand as an integer value using a common scale. For example, a scale of −2 may be required to represent a first operand as an integer value: $3*10^{-2}$ (i.e., scale−2, mantissa 3). If a second operand is $2*10^9$ (i.e., scale 9, mantissa 2), and the optimized decimal format uses a 32-bit mantissa, then it may be impossible to represent $2*10^{11}$ (i.e., $2 \cdot 10^{11}*10^{-2}$) in the optimized decimal format.

In Step 356, the arithmetic operation is specialized for inputs represented in the optimized decimal format. In one or more embodiments, the arithmetic operation is specialized to use the common scale to represent its inputs. In one or more embodiments, the arithmetic operation is compiled, to an instruction native to the computer system, for operands represented using the common scale for the optimized decimal format. In one or more embodiments, the arithmetic operation may be specialized to adjust the mantissa as needed for any inputs whose shape does not already include the common scale. Execution then continues with Step 360 below.

In Step 358, the arithmetic operation is specialized for the initial decimal format. In one or more embodiments, the arithmetic operation may be specialized to perform an implicit conversion of any inputs represented in the optimized decimal format to the initial decimal format (e.g., where the scale of optimized decimal format is used as the scale of the initial decimal format). Step 358 corresponds to a "slow path" for evaluating the arithmetic operation.

In one or more embodiments, when the specialized arithmetic operation has already been compiled into native instructions by the JIT compiler, initiating the slow path includes de-optimizing the native instructions for the specialized arithmetic operation. In one or more embodiments, an expression tree (e.g., an expression tree that includes the arithmetic operation) has typically reached a stable, specialized form long before the JIT compiler compiles the expression tree into native instructions. For example, the JIT compiler may be activated after a threshold number of evaluations (e.g., executions) of an expression tree (e.g., more than 1000), while an expression tree may reached a stable, specialized within a very small number of evaluations (e.g., less than 10).

In one or more embodiments, de-optimizing the native instructions for the expression tree may be triggered by other specializations of an operation (e.g., a conversion operation or an arithmetic operation) of the expression tree. For example, adjusting the maximum scale based on the scales of the inputs to the arithmetic operation in Step 356 above may also trigger de-optimization of the expression tree.

In Step 360, if there are additional operands to be processed, then execution continues with Step 350 above, to obtain the next operands for the arithmetic operation.

In one or more embodiments, the specialized arithmetic operation is added to a new specialized expression tree generated from the initial expression tree. Alternatively, the specialized arithmetic operation may replace an existing arithmetic operation in the initial expression tree. Arithmetic operations in an expression tree may be specialized according to the process described in FIG. 3B as the expression tree is traversed (e.g., recursively), where the result of one arithmetic operation is used as an input (e.g., an operand) to the next arithmetic operation (e.g., a child arithmetic operation in the expression tree).

Experiments using a prototype implementation of the optimization techniques embodied in FIG. 2 and FIG. 3 demonstrated a nearly 100% speedup on the arithmetic-intensive query Q1 from the TPC-H (Transaction Processing Performance Council) benchmark. Thus, the optimization techniques embodied in FIG. 2 and FIG. 3 may provide improved performance in scenarios where queries use arithmetic-intensive operations (e.g., cannot rely on in-memory-columnar optimization for caching numeric columns).

The following example is for explanatory purposes only and not intended to limit the scope of the invention. FIG. 4A, FIG. 4B, FIG. 4C, FIG. 4D, and FIG. 4E show an implementation example in accordance with one or more embodiments of the invention.

Figure 4A:
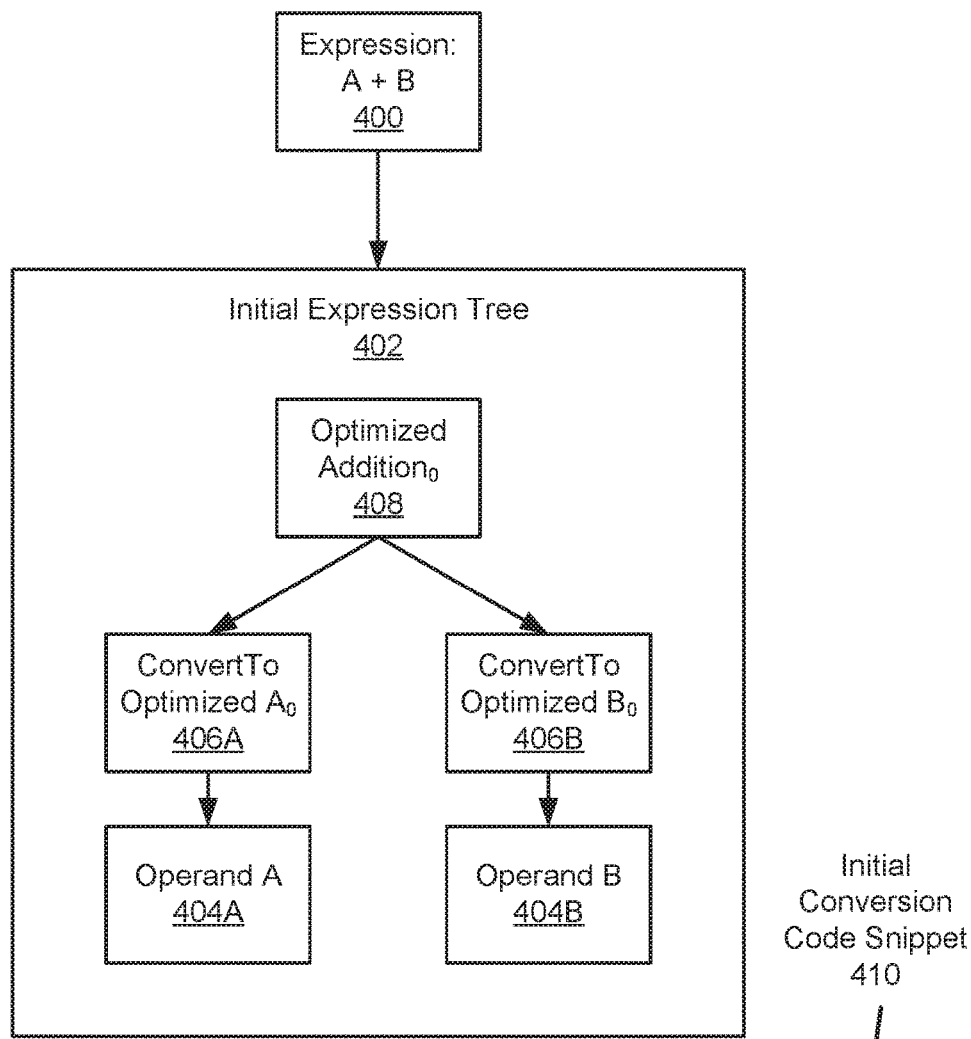

Initially, the ahead-of-time compiler (105) generates an initial expression tree (402) from an expression (400), "A+B", as shown in FIG. 4A. The initial expression tree (402) includes operands (404A, 404B), conversion operations (406A, 406B), and an optimized addition operation (408). The values of the operands (404A, 404B) are represented in base 100 digits. The conversion operation ConvertToOptimized$A_0$ (406A) converts operand A (404A) to the optimized decimal format (120). Similarly, the conversion operation ConvertToOptimized$B_0$ (406B) converts operand B (404B) to the optimized decimal format (120). The addition operation OptimizedAddition$_0$ (408) expects its inputs to be in the optimized decimal format (120). The conversion operations (406A, 406B) and the addition operation (408) are in an un-specialized state. That is, the conversion operations (406A, 406B) and the addition operation (408) may be specialized, at runtime, depending on their inputs, as described below.

Each conversion operation (406A, 406B) is coded to specialize itself based on whether the runtime value of its corresponding input operand (404A, 404B) can be converted to the optimized decimal format (120). Each conversion operation (406A, 406B) includes initial (e.g., un-specialized) conversion code snippet (410) shown in FIG. 4A, which returns a conversion operation that either is specialized to convert its input to the optimized decimal format (120) or is specialized to convert its input to the initial decimal format (118).

Figure 4B:
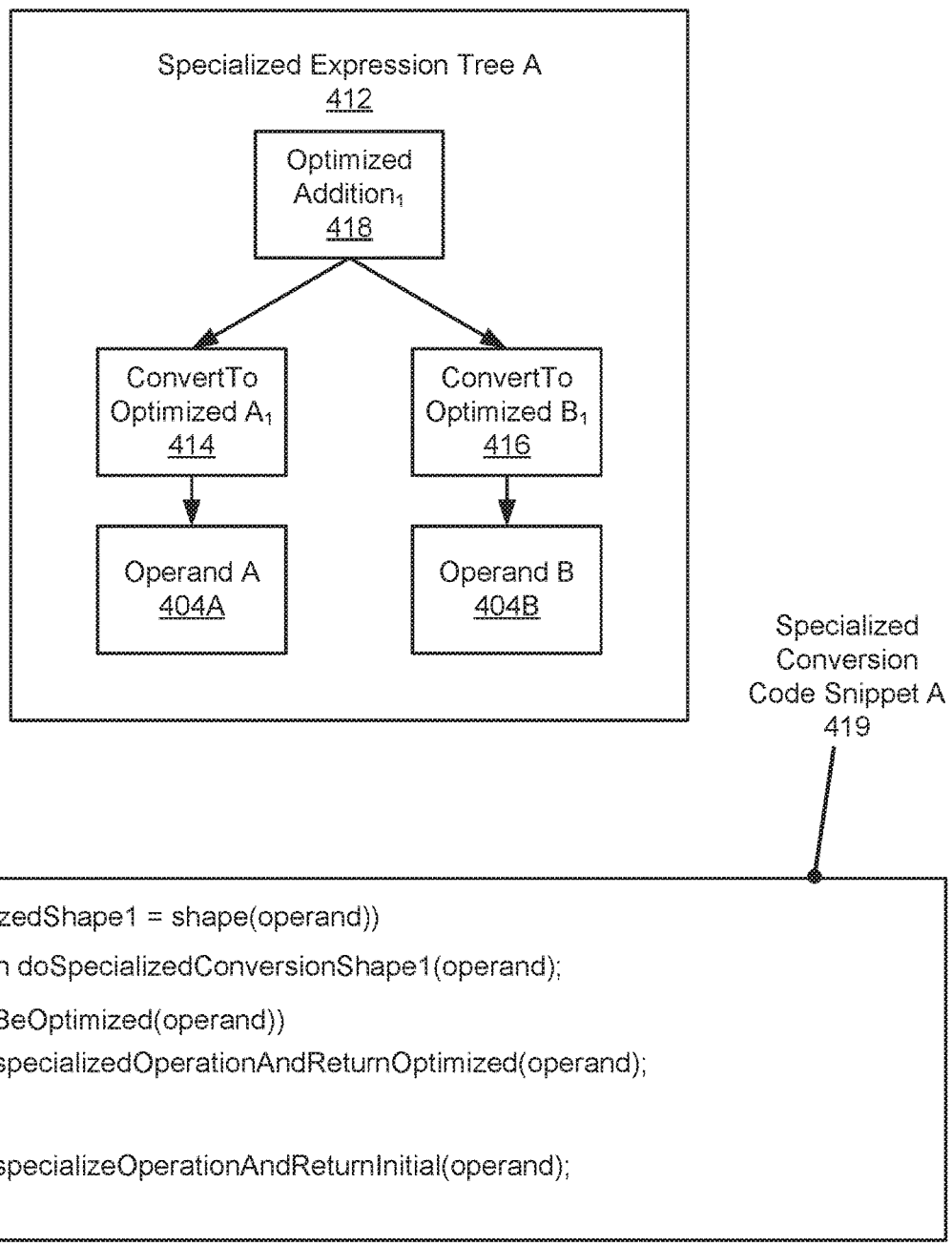

The runtime system (104) then evaluates expression (400) with a first set of operand values: a value of 3 for operand A (404A) and a value of 40 for operand B (404B). The runtime system (104) generates specialized expression tree A (412), as shown in FIG. 4B, based on the shapes of the first set of operand values. Specialized expression tree A (412) includes specialized conversion operations (414, 416) and a specialized addition operation (418). Each specialized conversion operation (414, 416) is specialized according to the specific shape (i.e., length, sign, and scale) of the initial decimal format (118) used to represent the value of the corresponding operand (404A, 404B). That is, the specialized conversion operations (414, 416) assume that the shape of the corresponding operand (404A, 404B) is constant, and that any values derived from the shape are compile-time constants. The specialized conversion operation ConvertToOptimized$A_1$ (414) converts operand A (404A) to the optimized decimal format (120) based on the shape of the value, in this case 3, of operand A (404A) in the first set of operand values. The specialized conversion operation ConvertToOptimized$B_1$ (416) converts operand B (404B) to the optimized decimal format (120) based on the shape of the value, in this case 40, of operand B (404B) in the first set of operand values. Based on the first set of operand values, both specialized conversion operations (414, 416) assume a shape with length=1 (e.g., since a single base 100 digit is used to represent both operands (404A, 404B)), scale=0, and sign=1.

Specialized conversion operations ConvertToOptimized$A_1$ (414) and ConvertToOptimized$B_1$ (416) include specialized conversion code snippet A (419) shown in FIG. 4B, which returns a conversion operation that is specialized to convert its input to the optimized decimal format (120) according to the shape of the value of the corresponding operand (404A, 404B) in the first set of operand values.

The specialized addition operation OptimizedAddition$_1$ (418) is specialized to expect its inputs to be in the specific optimized decimal formats (120) output by the specialized conversion operations (414, 416).

Figure 4C:
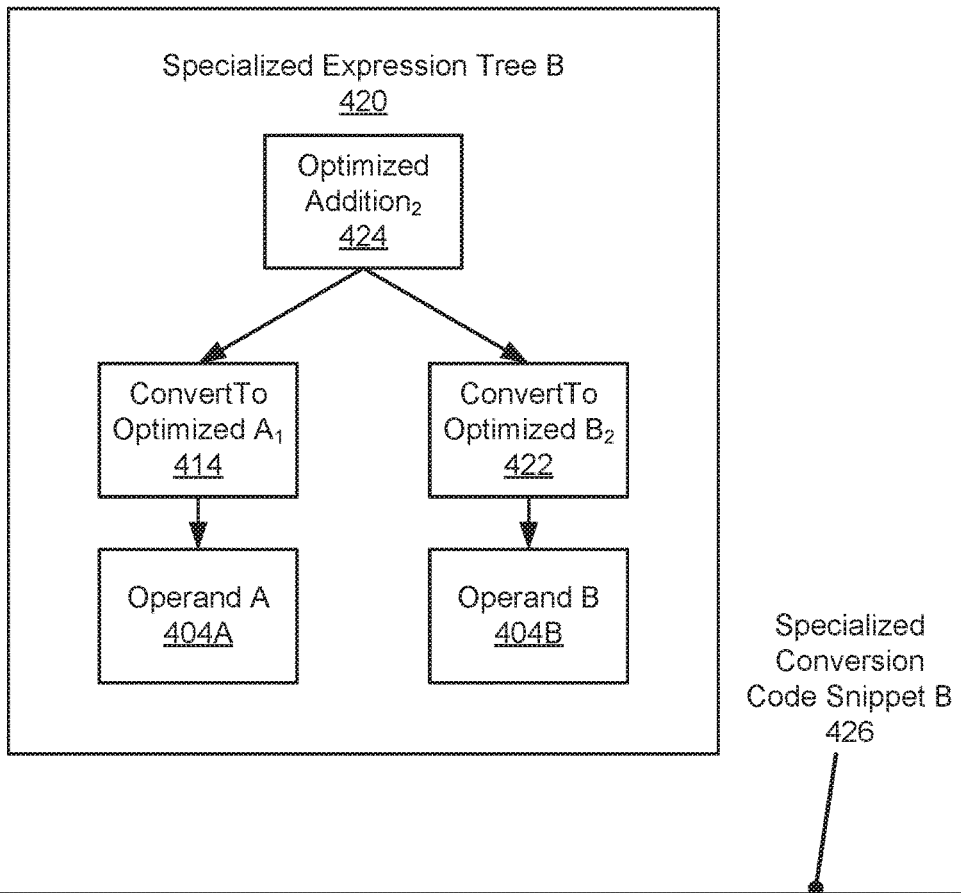

The runtime system (104) next evaluates expression (400) with a second set of operand values: a value of 11 for operand A (404A) and a value of 312 for operand B (404B). The runtime system (104) then generates specialized expression tree B (420), as shown in FIG. 4C, based on the shapes of the second set of operand values. Like specialized expression tree A (412) in FIG. 4B, specialized expression tree B (420) includes the specialized conversion operation ConvertToOptimizedA$_1$ (414), because the shape of the value of operand A (404A) in the second set of operand values is the same as the shape of operand A (404A) in the first set of operand values (e.g., the value 11 is also represented as a single base 100 digit). However, specialized expression tree B (420) includes a new specialized conversion operation ConvertToOptimizedB$_2$ (422) that is specialized to handle the shape of the value of operand B (404B) in the second set of operand values (e.g., the value 312 cannot be represented as a single base 100 digit). The specialized conversion operation ConvertToOptimizedB$_2$ (422) also handles the case where the value of operand B (404B) has the shape of the value of operand B (404B) in the first set of operand values, as in the specialized conversion operation ConvertToOptimizedB$_1$ (416) of FIG. 4B.

Specialized conversion operation ConvertToOptimizedB$_2$ (422) includes specialized conversion code snippet B (426) shown in FIG. 4C, which returns a conversion operation that is specialized to convert its input to the optimized decimal format (120) according to the shape of the value of operand B (404B) in either of the first 2 sets of operand values.

Specialized expression tree B (420) also includes a new specialized addition operation OptimizedAddition$_2$ (424) that is specialized to also handle the case when its inputs have different shapes, in addition to the case when both inputs have the same shape, as in the specialized addition operation OptimizedAddition$_1$ (418) of FIG. 4B.

Figure 4D:
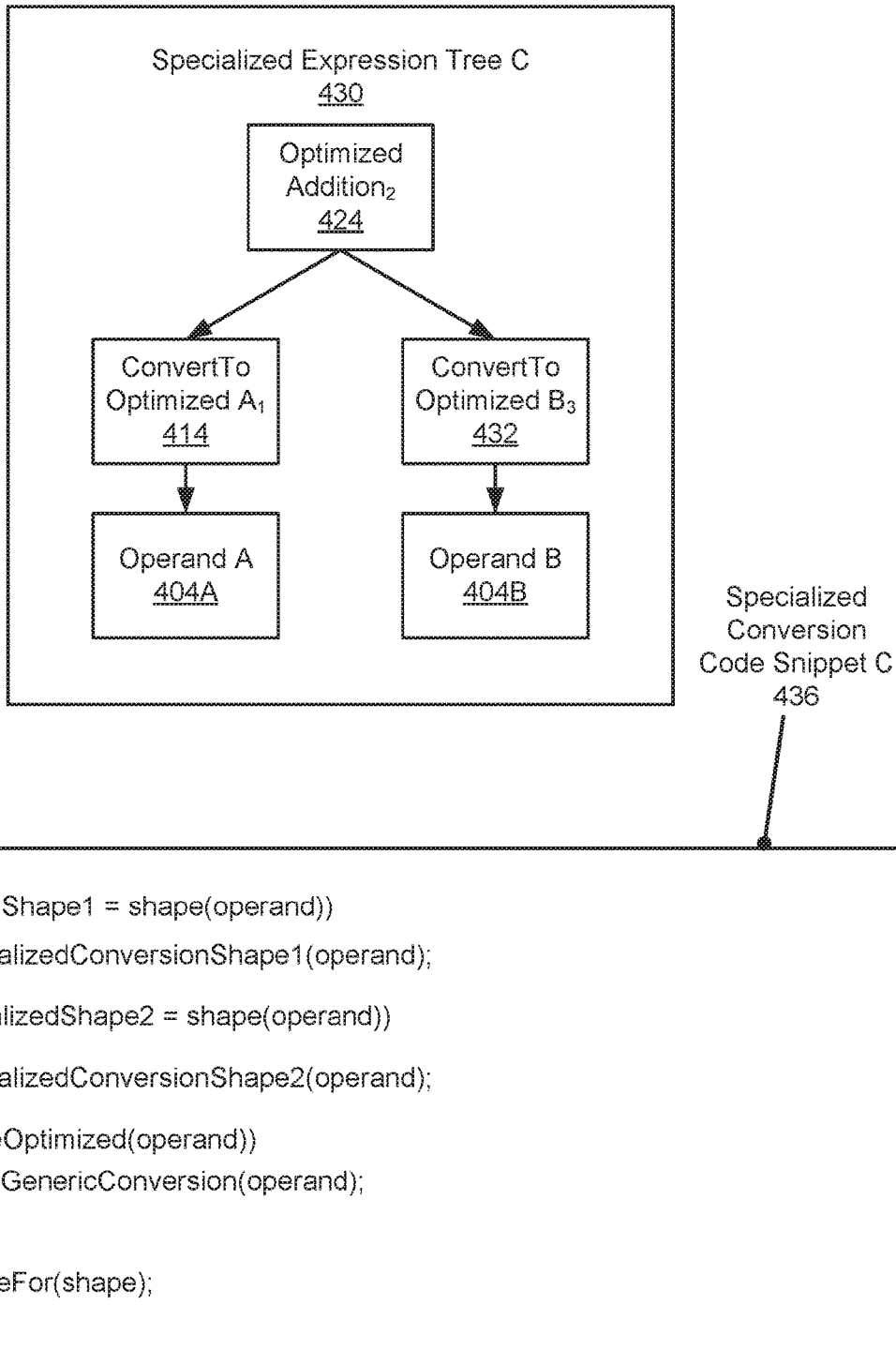

The runtime system (104) next evaluates expression (400) with a third set of operand values: a value of 63 for operand A (404A) and a value of 123456 for operand B (404B). The runtime system (104) then generates specialized expression tree C (430), as shown in FIG. 4D, that includes a new specialized conversion operation ConvertToOptimizedB$_3$ (432). However, the shape of the value of operand B (404B) in the third set of operand values does not match either of the shapes for which ConvertToOptimizedB$_2$ (422) of FIG. 4C has been specialized for (e.g., the value 123456 cannot be represented as a single base 100 digit, or as 2 base 100 digits). Because a shape threshold of 2 for the maximum number of conversion shapes per conversion operation has been reached, ConvertToOptimizedB$_3$ (432) is specialized to perform a generic conversion to the optimized decimal format (120) that is not specialized for any particular shape of the value of operand B (404B), as described below. Furthermore, ConvertToOptimizedB$_3$ (432) tracks, in a conversion state, the history of scale values corresponding to the history of input values.

Specialized conversion operation ConvertToOptimizedB$_3$ (432) includes specialized conversion code snippet C (436) shown in FIG. 4D, which returns a conversion operation that is specialized to convert its input to the optimized decimal format (120) according to 2 possible shapes of the value of operand B (404B) or via the generic conversion.

The table of conversion states (440) shown in FIG. 4E illustrates the evolution of the conversion state (444) of a generic conversion operation based on a history of initial decimal values (442).

The first time that the generic conversion operation is executed, as shown in the first row of the table of conversion states (440) of FIG. 4E, the runtime system (104) determines minimum and maximum scales for the value "5". In this case, −8 is the minimum scale that may be used to represent the value "5", and 0 is the maximum scale that may be used to represent the value "5", due to the constraints of using a 32-bit integer representation to represent each initial decimal value (442). The runtime system (104) then sets the minimum scale and the maximum scale of the conversion state (444) to −8 and 0, respectively, since a history of converting the values does not yet exist. The runtime system (104) then sets the current scale of the conversion state (444) to the maximum scale of 0, since the runtime system (104) favors larger scales when possible (e.g., to help reduce the size of the binary mantissa). The runtime system (104) then sets the current scale of 0 as a constant in the generic conversion operation, based on an optimistic speculation that the current scale of 0 will be sufficient to convert future values to the optimized decimal format (e.g., as the value of an operand is converted multiple times, as rows or columns of a table are processed by a query). Finally, the runtime system (104) generates an optimized decimal value (446) with a mantissa of 5 and a scale of 0.

The second time the generic conversion operation is executed, as shown in the second row of the table of conversion states (440), the runtime system (104) determines that −7 is the minimum scale that may be used to represent the value "123", and 0 is the maximum scale that may be used to represent the value "123". The runtime system (104) then reduces the minimum scale of the conversion state (444) to −7, while the maximum scale of the conversion state (444) remains unchanged at 0. The runtime system (104) does not need to recompile the generic conversion operation, since the current scale is unchanged at 0. The runtime system (104) then generates an optimized decimal value (446) with a mantissa of 123 and a scale of 0.

The third time the generic conversion operation is executed, as shown in the third row of the table of conversion states (440), the runtime system (104) determines that −7 is the minimum scale that may be used to represent the value "400", and 1 is the maximum scale that may be used to represent the value "400". Therefore, no adjustment is needed to either the minimum scale or the maximum scale of the conversion state (444), and the runtime system (104) does not need to recompile the generic conversion operation. The runtime system (104) then generates an optimized decimal value (446) with a mantissa of 400 and a scale of 0.

The fourth time the generic conversion operation is executed, as shown in the fourth row of the table of conversion states (440), the runtime system (104) determines that −8 is the minimum scale that may be used to represent the value "15.67", and −1 is the maximum scale that may be used to represent the value "15.67". The minimum scale of the conversion state (444) remains unchanged at −7, however, the runtime system (104) reduces the maximum scale of the conversion state (444) to −1. Therefore, the runtime system (104) sets the current scale of the conversion state (444) to −1, and then recompiles the generic conversion operation with the new current scale of −1. The runtime system (104) then generates an optimized decimal value (446) with a mantissa of 1567 and a scale of −1.

The fifth time the generic conversion operation is executed, as shown in the fifth row of the table of conversion states (440), the runtime system (104) determines that −6 is the minimum scale that may be used to represent the value "29174", and 0 is the maximum scale that may be used to represent the value "29174". Therefore, no adjustment is needed to either the minimum scale or the maximum scale of the conversion state (444), and the runtime system (104) does not need to recompile conversion A (422A). The runtime system (104) then generates an optimized decimal value (446) with a mantissa of 2917400 and a scale of −1. The mantissa is the input value of 29174 multiplied by 100 since it is not permitted to use the maximum possible scale of 0 for the input value 29174.

The sixth time conversion A (422A) is executed, as shown in the sixth row of the table of conversion states (440), the runtime system (104) determines that minus infinity is the minimum scale that may be used to represent the value "0", and positive infinity is the maximum scale that may be used to represent the value "0". Therefore, no adjustment is needed to either the minimum scale or the maximum scale of the conversion state (444), and the runtime system (104) does not need to recompile conversion A (422A). In fact, the value "0" can be represented with any scale. The runtime system (104) then generates an optimized decimal value (446) with a mantissa of 0 and a scale of −1.

The seventh time conversion A (422A) is executed, as shown in the seventh row of the table of conversion states (440), the runtime system (104) determines that −15 is the minimum scale that may be used to represent the value "1e-14", and −7 is the maximum scale that may be used to represent the value "1e-14". However, this results in an empty valid range for the current scale of the conversion state (444), since −7 is less than the minimum scale (−6) of the conversion state (444). Therefore, the runtime system (104) ignores the conversion state (444), and generates an optimized decimal value (446) with a mantissa of 1 and a scale of −7 (i.e., the maximum scale that may be used to represent the value "1e-14"). Thus, the scale used by the generic conversion operation is now based on the (runtime) input value, and the current scale of the conversion state (444) is not compiled into the generic conversion.

The eighth time conversion A (422A) is executed, as shown in the eighth row of the table of conversion states (440), the runtime system (104) determines that −7 is the minimum scale that may be used to represent the value "123", and 0 is the maximum scale that may be used to represent the value "123". The runtime system (104) continues to ignore the conversion state (444), and generates an optimized decimal value (446) with a mantissa of 123 and a scale of 0. In an alternate scenario, the runtime system (104) may treat the input value of the seventh row above as anomalous with respect to the history of values of operand A (404A). For example, after processing the input value of the seventh row above, the runtime system (104) may reset the conversion state (444) (e.g., where the minimum scale is set to minus infinity and the maximum scale is set to positive infinity), to enable the runtime system (104) to once again attempt to optimize the generic conversion operation based on a recent history of values.

Figure 5A:
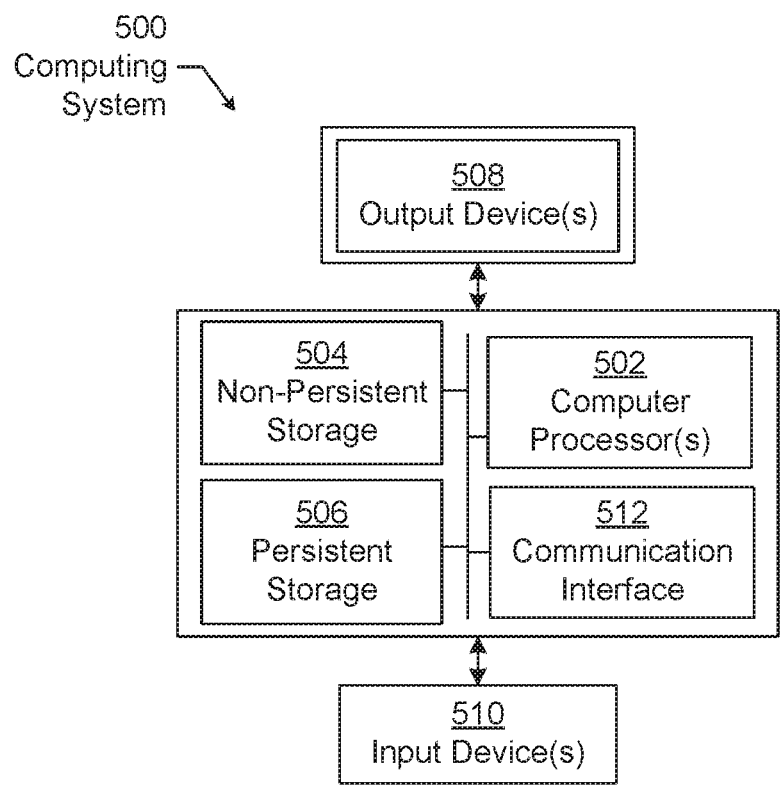
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
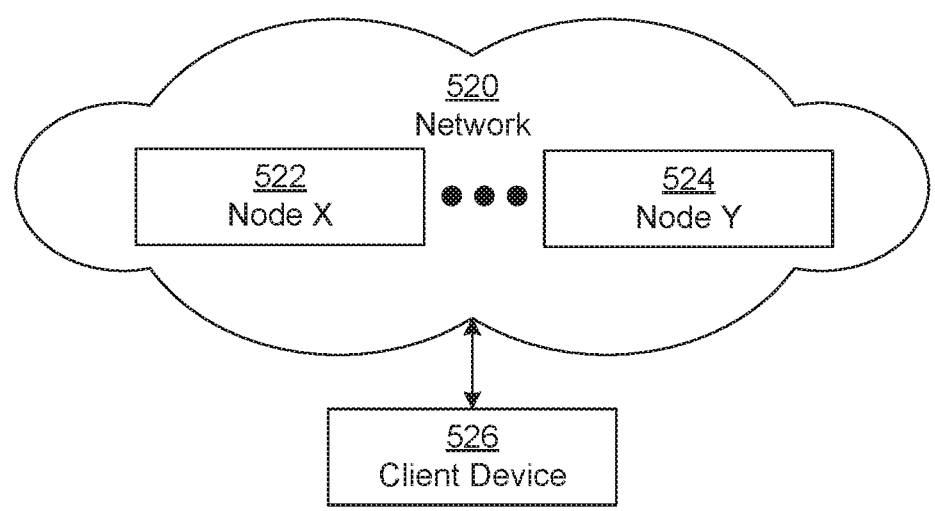

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. For example, a select or update statement may include an expression (110) with arithmetic operands represented in the initial decimal format (118). Moreover, the statement may include parameters that specify data, or data container (database, table, record, column, view, etc.), identifier(s), conditions (comparison operations), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
  generating, from an expression, an expression tree comprising an arithmetic operation and conversion operations each converting an operand of the arithmetic operation from an initial decimal format to an optimized decimal format, the initial decimal format comprising a shape comprising a scale represented as a decimal value, a length, and a sign;
  at runtime, evaluating the arithmetic operation with initial operands represented in the initial decimal format; and
  specializing one of the conversion operations according to the shape of the corresponding initial operand to obtain a specialized conversion operation comprising conversion shapes corresponding to shapes represented in the initial decimal format,
  wherein the specialized conversion operation is specialized by:
    at runtime, evaluating the arithmetic operation with next operands represented in the initial decimal format;
    determining that a shape of one of the next operands is not comprised by the conversion shapes;

determining that the number of conversion shapes is less than a threshold; and
in response to determining that the number of conversion shapes is less than the threshold, specializing the conversion operation according to the shape.

2. The method of claim 1, further comprising:
specializing the arithmetic operation according to the shape of one of the initial operands.

3. The method of claim 1, wherein the specialized conversion operation comprises a conversion state comprising the conversion shapes, and wherein the specialized conversion operation is further specialized by:
adding the shape to the conversion shapes.

4. The method of claim 1,
wherein the optimized decimal format comprises the scale represented as a binary value and a mantissa represented as a binary value.

5. The method of claim 4, wherein the specialized conversion operation comprises a conversion state comprising the conversion shapes and a maximum scale for the optimized decimal format, and wherein the conversion operation is further specialized by:
determining that the maximum scale for the optimized decimal format is insufficient to represent the scale of the shape in the optimized decimal format;
in response to determining that the maximum scale for the optimized decimal format is insufficient, updating, based on the scale of the shape, the maximum scale for the optimized decimal format; and
specializing the conversion operation using the updated maximum scale for the optimized decimal format.

6. The method of claim 5, further comprising:
determining that the next operands are represented in the initial decimal format using different scales;
calculating, for the next operands, a common scale for the optimized decimal format;
adjusting the mantissa of one of the next operands according to the common scale for the optimized decimal format prior to evaluating the arithmetic operation with the next operands; and
compiling, to an instruction native to a computer system, the arithmetic operation for operands represented using the common scale for the optimized decimal format.

7. The method of claim 1, further comprising:
determining that the initial operands cannot all be represented in the optimized decimal format; and
prior to evaluating the arithmetic operation with the initial operands, specializing the arithmetic operation to represent each of the initial operands in the initial decimal format.

8. The method of claim 7, further comprising:
in response to determining that the number of evaluations of the expression tree exceeds a threshold, compiling the expression tree into native instructions of a computer system,
wherein specializing the arithmetic operation comprises deoptimizing the expression tree.

9. A system, comprising:
a repository configured to store an expression and an expression tree;
a memory coupled to a processor;
an ahead-of-time compiler, executing on the processor and using the memory, configured to:
generate, from the expression, the expression tree comprising an arithmetic operation and conversion operations each converting an operand of the arithmetic operation from an initial decimal format to an optimized decimal format, the initial decimal format comprising a shape comprising a scale represented as a decimal value, a length, and a sign; and
a just-in-time (JIT) compiler, executing on the processor and using the memory, configured to:
at runtime, evaluate the arithmetic operation with initial operands represented in the initial decimal format; and
specialize one of the conversion operations according to the shape of the corresponding initial operand to obtain a specialized conversion operation comprising conversion shapes corresponding to shapes represented in the initial decimal format,
wherein the specialized conversion operation is specialized by:
at runtime, evaluating the arithmetic operation with next operands represented in the initial decimal format;
determining that a shape of one of the next operands is not comprised by the conversion shapes;
determining that the number of conversion shapes is less than a threshold; and
in response to determining that the number of conversion shapes is less than the threshold, specializing the conversion operation according to the shape.

10. The system of claim 9, wherein the JIT compiler is further configured to:
specialize the arithmetic operation according to the shape of one of the initial operands.

11. The system of claim 9, wherein the specialized conversion operation comprises a conversion state comprising the conversion shapes, and wherein the specialized conversion operation is further specialized by:
adding the shape to the conversion shapes.

12. The system of claim 9,
wherein the optimized decimal format comprises the scale represented as a binary value and a mantissa represented as a binary value.

13. The system of claim 12, further comprising a profiler configured to generate a history of converting a plurality of values of the operand to the optimized decimal format, wherein the specialized conversion operation comprises a conversion state comprising the conversion shapes and a maximum scale for the optimized decimal format, and wherein the conversion operation is further specialized by:
determining that the maximum scale for the optimized decimal format is insufficient to represent the scale of the shape in the optimized decimal format;
in response to determining that the maximum scale for the optimized decimal format is insufficient, updating, based on the scale of the first shape, the maximum scale for the optimized decimal format; and
specializing the conversion operation using the updated maximum scale for the optimized decimal format.

14. The system of claim 13, wherein the JIT compiler is further configured to:
determine that the next operands are represented in the initial decimal format using different scales;
calculate, for the next operands, a common scale for the optimized decimal format;
adjust the mantissa of one of the next operands according to the common scale for the optimized decimal format prior to evaluating the arithmetic operation with the next operands; and compile, to an instruction native to the processor, the arithmetic operation for operands represented using the common scale for the optimized decimal format.

15. The system of claim 9, wherein the JIT compiler is further configured to:
   determine that the initial operands cannot all be represented in the optimized decimal format;
   prior to evaluating the arithmetic operation with the initial operands, specialize the arithmetic operation to represent each of the initial operands in the initial decimal format; and
   in response to determining that the number of evaluations of the expression tree exceeds a threshold, compile the expression tree into native instructions of a computer system,
   wherein specializing the arithmetic operation comprises deoptimizing the expression tree.

16. A non-transitory computer readable medium comprising instructions that, when executed by a processor, perform:
   generating, from an expression, an expression tree comprising an arithmetic operation and conversion operations each converting an operand of the arithmetic operation from an initial decimal format to an optimized decimal format, the initial decimal format comprising a shape comprising a scale represented as a decimal value, a length, and a sign;
   at runtime, evaluating the arithmetic operation with initial operands represented in the initial decimal format; and
   specializing one of the conversion operations according to the shape of the corresponding initial operand to obtain a specialized conversion operation comprising conversion shapes corresponding to shapes represented in the initial decimal format,
   wherein the specialized conversion operation is specialized by:
      at runtime, evaluating the arithmetic operation with next operands represented in the initial decimal format;
      determining that a shape of one of the next operands is not comprised by the conversion shapes;
      determining that the number of conversion shapes is less than a threshold; and
      in response to determining that the number of conversion shapes is less than the threshold, specializing the conversion operation according to the shape.

17. The non-transitory computer readable medium of claim 16, further comprising instructions that perform:
   specializing the arithmetic operation according to the shape of one of the initial operands.

18. The non-transitory computer readable medium of claim 16, wherein the specialized conversion operation comprises a conversion state comprising the conversion shapes, and wherein the specialized conversion operation is further specialized by:
   adding the shape to the conversion shapes.

19. The non-transitory computer readable medium of claim 16, wherein the specialized conversion operation comprises a conversion state comprising the conversion shapes and a maximum scale for the optimized decimal format, wherein the optimized decimal format comprises the scale represented as a binary value and a mantissa represented as a binary value, and wherein the conversion operation is further specialized by:
   determining that the maximum scale for the optimized decimal format is insufficient to represent the scale of the shape in the optimized decimal format;
   in response to determining that the maximum scale for the optimized decimal format is insufficient, updating, based on the scale of the shape, the maximum scale for the optimized decimal format; and
   specializing the conversion operation using the updated maximum scale for the optimized decimal format.

20. The non-transitory computer readable medium of claim 19, further comprising instructions that perform:
   determining that the next operands are represented in the initial decimal format using different scales;
   calculating, for the next operands, a common scale for the optimized decimal format;
   adjusting the mantissa of one of the next operands according to the common scale for the optimized decimal format prior to evaluating the arithmetic operation with the next operands; and
   compiling, to an instruction native to the processor, the arithmetic operation for operands represented using the common scale for the optimized decimal format.

* * * * *